US006978298B1

(12) United States Patent
Kuehr-McLaren

(10) Patent No.: US 6,978,298 B1
(45) Date of Patent: Dec. 20, 2005

(54) METHOD AND APPARATUS FOR MANAGING SESSION INFORMATION IN A DATA PROCESSING SYSTEM

(75) Inventor: David G. Kuehr-McLaren, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/577,391

(22) Filed: May 25, 2000

(51) Int. Cl.[7] .............................................. G06F 15/167

(52) U.S. Cl. ....................... 709/223; 709/224; 709/225; 709/227; 709/228; 709/104; 714/51; 711/140

(58) Field of Search ................................ 709/227, 228, 709/202, 203, 224, 225, 104, 105; 711/140–149; 714/51, 55

(56) References Cited

U.S. PATENT DOCUMENTS 6,041,357 A * 3/2000 Kunzelman et al. ........ 709/228
6,076,108 A * 6/2000 Courts et al. ............... 709/227
6,434,669 B1 * 8/2002 Arimilli et al. ............. 711/128
6,446,225 B1 * 9/2002 Robsman et al. ............. 714/55
6,490,624 B1 * 12/2002 Sampson et al. ........... 709/227

OTHER PUBLICATIONS

Schneier, Bruce, Applied Cryptography, 1996, John Wiley & Sons, Second Edition, pp. 179–181.*
Freir, Alan O. et al.; The SSL Protocol Version 3.0; Mar. 1996; pp. 1–28.

* cited by examiner

*Primary Examiner*—Ario Etienne
*Assistant Examiner*—Shabana Qureshi
(74) *Attorney, Agent, or Firm*—Duke W. Yee; Gerald R. Woods; Cathrine K. Kinslow

(57) ABSTRACT

A method and apparatus in a data processing system for managing sessions for a secure access to the data processing system. A request for a secure connection is received. The secure connection is established, wherein information used to facilitate the secure connection is generated. The information is stored for a selected period of time, wherein the selected period of time is selected to optimize server resources.

18 Claims, 8 Drawing Sheets

| Model 300 | |
|---|---|
| Application layer | 302 |
| Presentation layer | 304 |
| Session layer | 306 |
| Transport layer | 308 |
| Network layer | 310 |
| Data link layer | 312 |
| Physical layer | 314 |

RSW9-2000-0018-US1

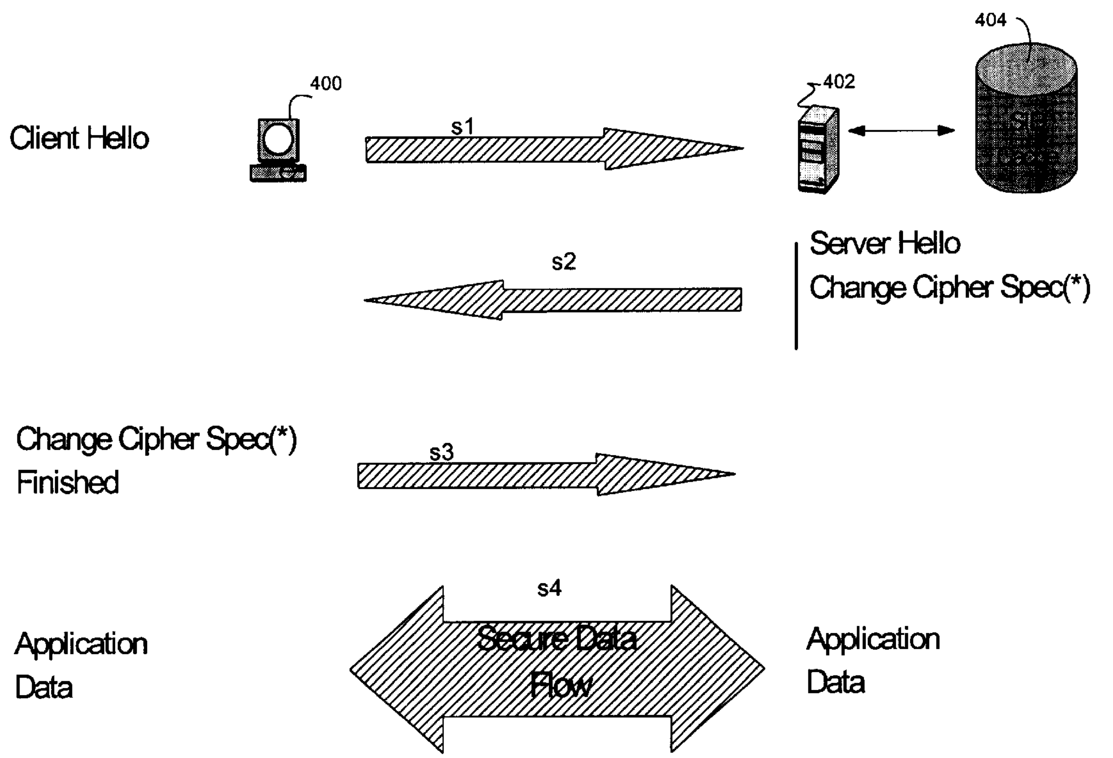
Figure 5
* Optional
Figure 6
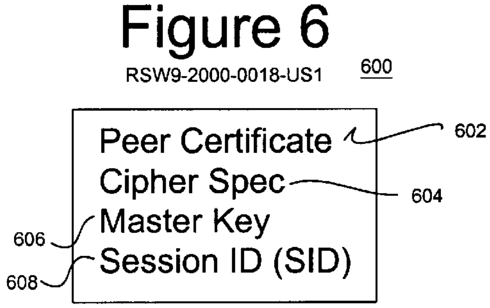

METHOD AND APPARATUS FOR MANAGING SESSION INFORMATION IN A DATA PROCESSING SYSTEM

BACKGROUND OF THE INVENTION

1. Technical Field:

The present invention provides an improved data processing system and in particular provides a method and apparatus for handling connections to a data processing system. Still more particularly, the present invention provides a method and apparatus for managing information used in transferring data over a connection.

2. Description of Related Art:

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. This type of commerce is referred to as "e-commerce". In offering goods and services, some companies offer goods and services solely on the Web while others use the Web to extend their reach.

With the widespread use of the Internet in commercial and business transactions, security is a concern in the transfer of data in these type of transactions. The security concern also applies to other data transfers in which privacy or security is desired. Currently, a security protocol, such as secure sockets layer (SSL), is often used to provide secure connections for data transfer. When a SSL session is started, the server sends its public key to the browser so that the browser can securely send a secret key to the server. The browser and server exchange data via secret key encryption during that session. SSL performance is becoming a factor in the ability to scale e-commerce applications. With secure connections, the most processor intensive part of a source connection, such as a SSL connection, is the initial handshake in which public key cryptography is used to exchange key material to establish a symmetric encryption pipe for the connection between two nodes, such as, a server and a client.

In scaling SSL connections for use in e-commerce, hardware acceleration is commonly used in cryptographic operations. Presently available hardware can only achieve hundreds of connections per second. Such a limitation in presently available hardware constrains the amount of scaling that may occur in SSL connections.

Therefore, it would be advantageous to have an improved method and apparatus for handling SSL connections.

SUMMARY OF THE INVENTION

The present invention provides a method and apparatus in a data processing system for managing sessions for a secure access to the data processing system. A request for a secure connection is received. The secure connection is established, wherein information used to facilitate the secure connection is generated. The information is stored for a selected period of time, wherein the selected period of time and information stored is selected to optimize server resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a data flow diagram illustrating a SSL handshake involving a cached session in accordance with a preferred embodiment of the present invention;

DETAILED DESCRIPTION OF THE PREFERRED EMBODIMENT

Figure 1:
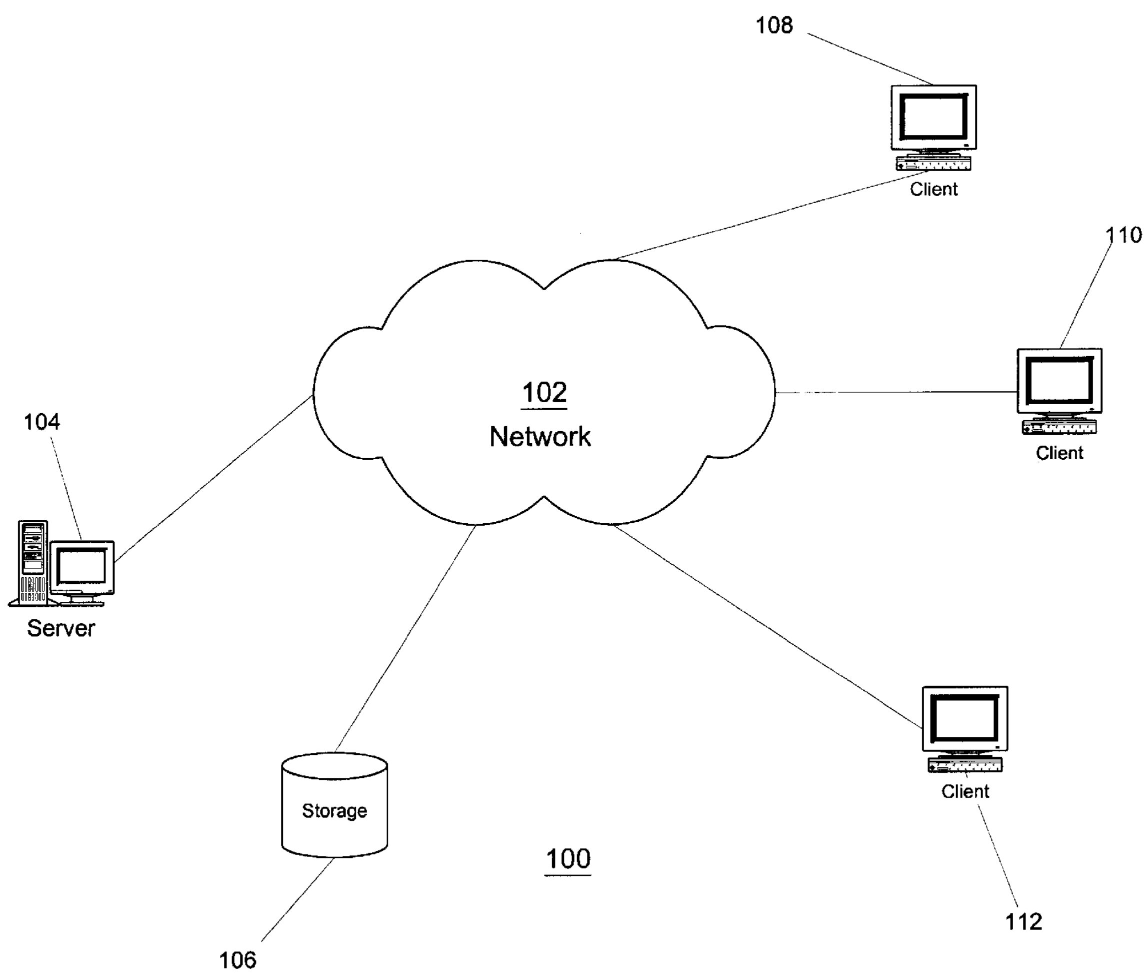
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data-processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN).

The present invention provides a method, apparatus, and computer implemented instructions for facilitating a scaling of connections between a server and a client, such as server 104 and client 108. In particular, the mechanism of the present invention may be applied to secure connections, such as SSL. The present invention recognizes that with SSL, a mechanism is provided to cache or store the key material for use in subsequent connections. The period of time the server caches this information is referred to as a SSL session. The entry in the cache for this information is indexed by session ID (SID).

The cache containing this information for SSL was originally designed to enhance loading of a single web page. With HTTP, each object displayed on a web page requires a separate TCP/IP connection and a SSL handshake. Presently, a typical SSL session timeout is set to average the time period required to load a single web page.

The mechanism of the present invention uses the ability to adjust the period of time during which information maintained in a cache. This adjustment is a dynamic one as opposed to a long session timeout value. If a long session timeout value is used, the search time and management of an extremely large cache will actually degrade the performance of the server in handling SSL connections. With dynamic management of cache information, the limitations of presently available cryptographic hardware may be overcome.

FIG. 1 is intended as an example, and not as an architectural limitation for the present invention.

Figure 2:
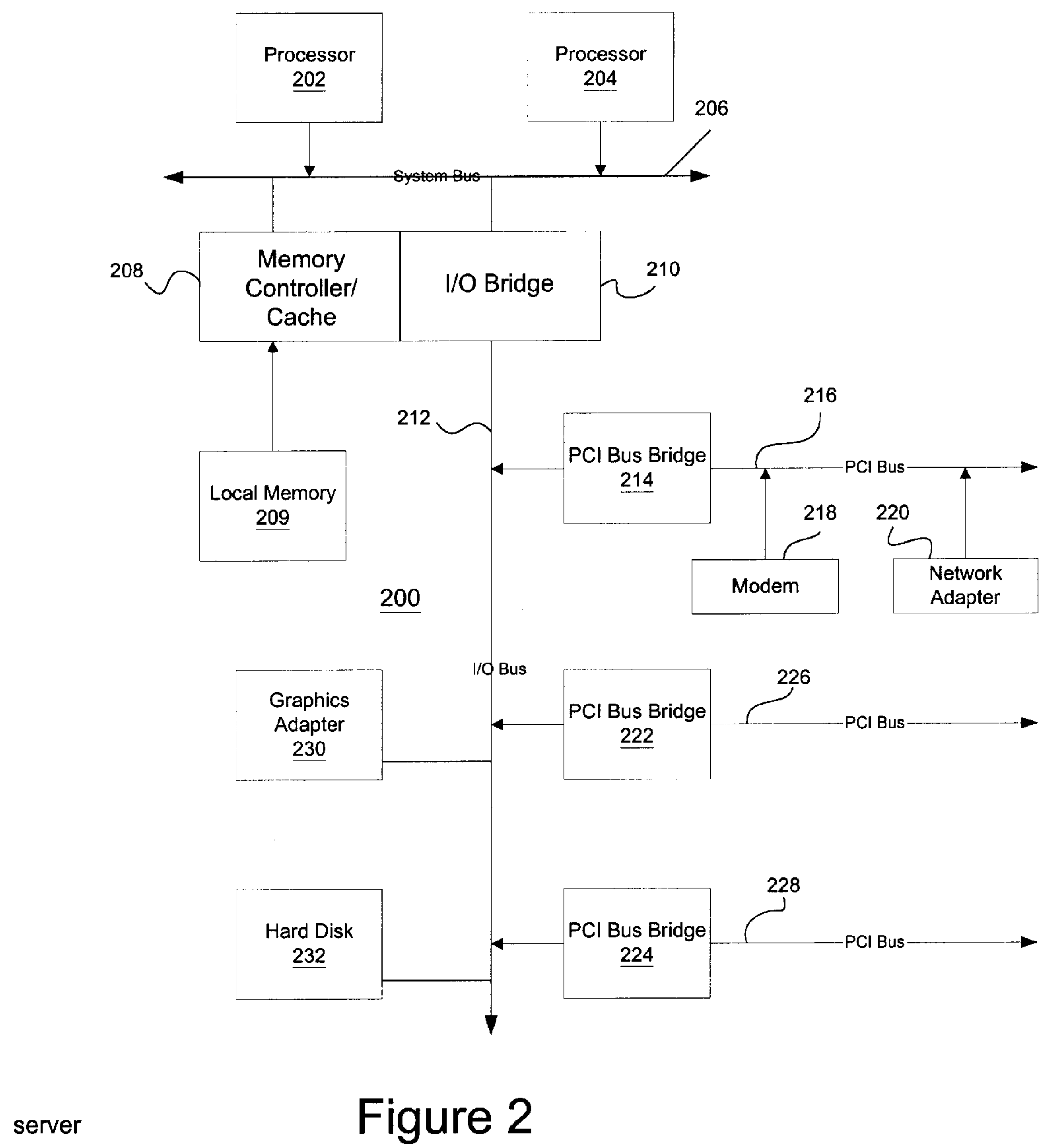
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

In these examples, the mechanism of the present invention used to manage information in a cache is implemented in a server, such as, for example, data processing system 200 in FIG. 2. The mechanism of the present invention is particularly useful in the handling information stored in a cache in which the information is used to facilitate a connection between a client or requestor and the computer. This cache is located in a storage device, such as, for example, local memory 209 or in hard disk 232 in these examples.

When a request is received from a communications adapter, such as, for example, modem 218 or network adapter 220, a connection may be established between data processing system 200 and a client, such as client 108 in FIG. 1. This connection may involve authentication and authorization steps. Further, when secure connections are involved, a number of steps occur between the client and data processing system 200 to enable secure transmission of data between the client and data processing system 200 over the connection.

Information generated for use in transferring encrypted data for the connection is stored in the cache. The time during which the information is maintained is also referred to as "session", which can span multiple connections between two data processing systems. When the information is removed or unavailable, a client is required to go through the steps needed to reestablish a session. If another request is made by the same client for another connection and the information is present in the cache, the new connection is a "resume" session. In this case, data transfers may occur without going through the steps used to initially establish the connection for the first time.

The mechanism of the present invention dynamically adjusts the time during which the information will be maintained such that if a request for a connection is received from the same client, the steps used to establish the session can be avoided by using the information stored in the cache. These adjustments are made in a manner to optimize the performance of a server in handling requests. These adjustments may be made using a number of factors. For example, based on the search time needed to retrieve information from the cache, the amount of time during which information is retrieved may be adjusted to optimize performance of the server. Also, the number of new connections and resumed connections may be tracked.

In addition, the cache size may be adjusted based on performance. The size of the cache may be balanced against timeout values to maintain search time used to retrieve information from the cache at some threshold value. This threshold value is selected to avoid reducing performance, such as response time to a request, beyond a limit deemed as desirable by a user or system administrator.

Additionally, processes may be implemented to identify clients that are likely to request additional connections. The amount of time during which information is available for these clients may be adjusted such that the information is available for a longer period of time. Additionally, this information may be ordered to the top of a search.

Adjustments to the time during which information is maintained in a cache may be made by receiving input from an application programming interface (API) or an application. For instance, a customer SSL session that queries the status of an order may need to be cached only for the time it takes to download the status page and page objects. A customer placing an order may take many minutes to complete selections and enter order information. The SSL session for the customer placing an order should be kept for longer periods of time and ordered to the beginning of the cache search.

Figures 3, 4:
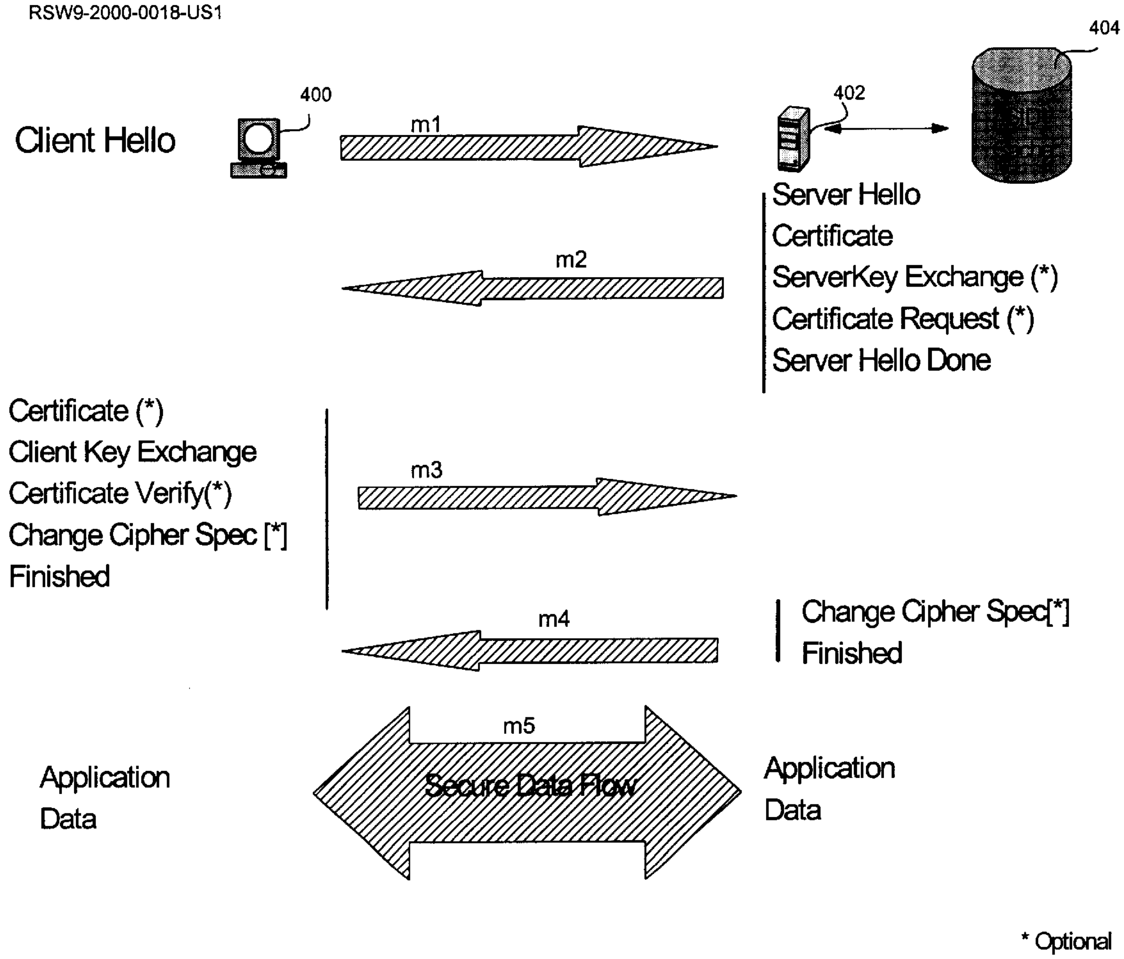
FIG. 3 depicts a diagram of layers in a data processing system in accordance with a preferred embodiment of the present invention.
FIG. 4 depicts a data flow diagram illustrating a SSL handshake in accordance with a preferred embodiment of the present invention.

With reference now to FIG. 3, a diagram of layers in a data processing system is depicted in accordance with a preferred embodiment of the present invention. In this example, model 300 is an open system interconnection (OSI) model containing an application layer 302, a presentation layer 304, a session layer 306, a transport layer 308, a network layer 310, a data link layer 312, and a physical layer 314. The processes of the present invention may be implemented within application layer 302 and session layer 306. In these examples, model 300 is implemented in a server, such as data processing system 200 in FIG. 2.

Session layer 306 provides coordination of communications for a data processing system. This layer may determine one way or two way communications as well as managing dialog between the server and a client. Specifically, the mechanisms used to adjust the size of the cache as well as timeout values for maintaining information in the cache are implemented in session layer 306 in the depicted examples. When adjustments to timeout values are made by applications, these applications are located in application layer 302 in the depicted examples.

Turning next to FIG. 4, a data flow diagram illustrating a SSL handshake is depicted in accordance with a preferred embodiment of the present invention. The data flow illustrated in this figure is used to generate information stored in a cache for future connections with the same client or requestor.

The process begins by client 400 sending a client hello message to server 402 to initiate an SSL session (step m1). This hello message includes the encryption capabilities of the client. In response, server 402 performs a server hello, which contains several messages (step m2). These messages include sending the server 402's certificate and a cipher suite or mechanism for use in encrypting data based on the encryption capabilities of the client. Further, a session ID (SID) is sent to client 400. This SID may be used by client 400 to requester server 402 to reuse information stored in SID cache 404 during subsequent connections. A client finish then occurs (step m3). This step includes a key exchange, which involves the sending of key material used to create symmetric encryption keys for encrypted data. This key material is also known as the pre-master secret and is encrypted with server 402's public key from the server's certificate. Using this key material, both server 402 and client 400 can derive read and write symmetric encryption keys for use in securely exchanging data. This step also may include sending a certificate, verifying a certificate, and changing the cipher mechanism to that specified by server 402. Client 400 will cache the key information for later use in requesting additional connections. Until the finish message of the first full handshake, no encryption is used. Changing the cipher specification is the point where the SSL session goes from using no encryption to encrypting all records with the agreed upon symmetric cipher and keys.

In response to the client finish, server 402 performs a server finish (step m4). In this step, a final confirmation and a message authentication code of the handshake is sent. Then secured data flow occurs between client 400 and server 402 (step m5). All of the information generated in these steps may be stored in SID cache 404 for future connection requests by client 400.

Turning next to FIG. 5, a data flow diagram illustrating a SSL handshake involving a cached session is depicted in accordance with a preferred embodiment of the present invention. In FIG. 5, client 400 initiates another connection to server 402 by sending a client hello message and a SID (step s1). This hello message includes a list of cipher mechanisms or suites supported by client 400. Server 402 performs a server hello (step s2). This step involves looking up the SID sent by client 400 in SID cache 404. If the SID is present and unexpired, server 402 will reuse the key material and select a cipher suite or mechanism sent the client hello. This reuse of information saves on processor resources as well as reducing network flow between client 400 and server 402.

Client 400 sends a client finish message (step s3). In sending this message, the client calculates read and write keys based on key information already cached at client 400. Then, secured data flow occurs between client 400 and server 402 (step s4).

Turning next to FIG. 6, a diagram illustrating data stored in a cache is depicted in accordance with a preferred embodiment of the present invention. In this example, entry 600 includes a peer certificate 602, a cipher specification 604, a master key 606, and a SID 608. Peer certificate 602 is a digital certificate of the server in the client's cache and, optionally, the client's certificate in the server's cache. Cipher specification 604 is an identification of the encryption mechanism that is used for the transfer. Master key 606 is 606 is the key material used to derive the symmetric encryption keys for the connection. SID 608 is used as an index to obtain entry 600 from the cache.

Figure 7:
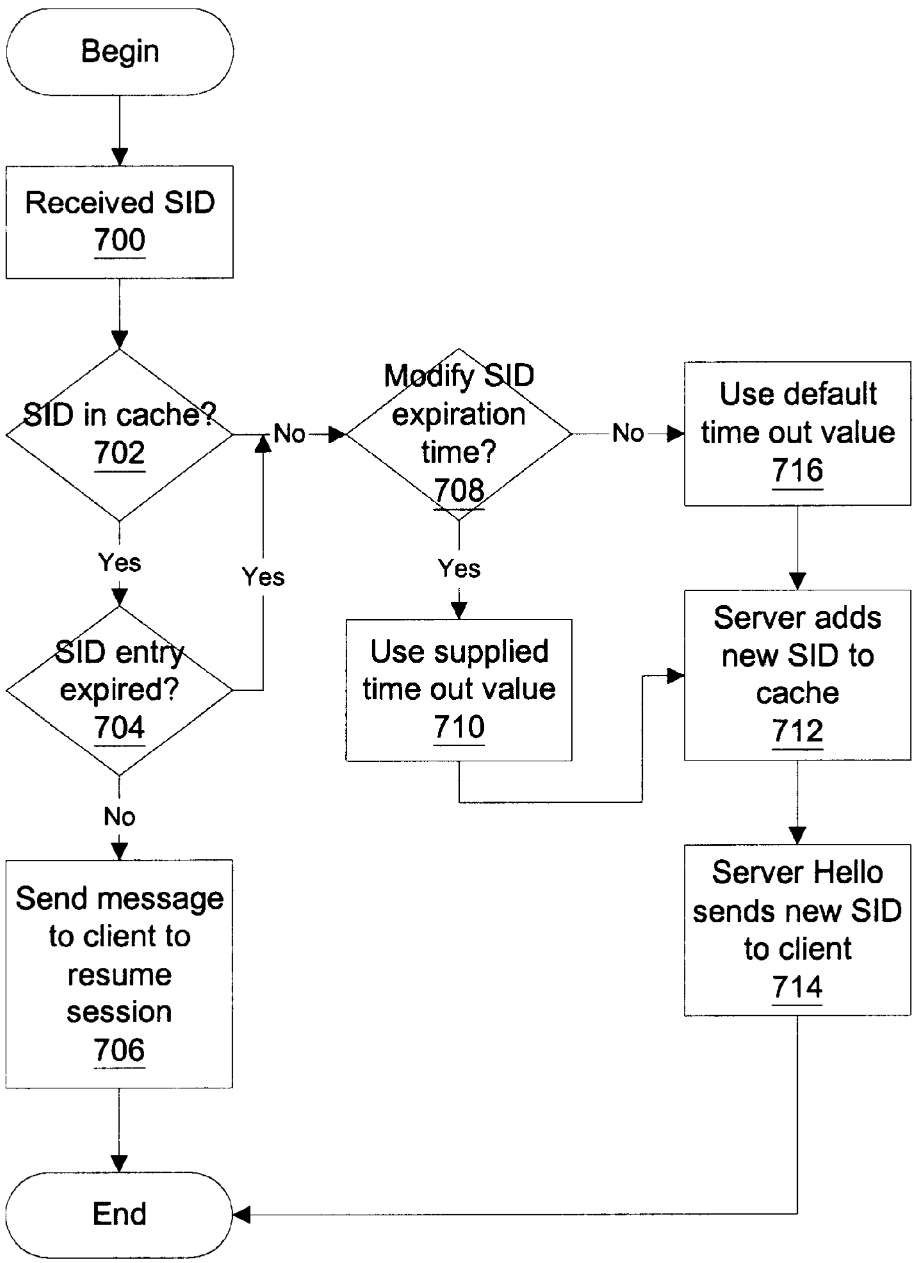
FIG. 7 depicts a flowchart of a process used to manage information for facilitating connections in accordance with a preferred embodiment of the present invention.

Turning next to FIG. 7, a flowchart of a process used to manage information for facilitating connections is depicted in accordance with a preferred embodiment of the present invention. The process illustrated in FIG. 7 is implemented in a server such as server 104 in FIG. 1 for handling connection requests from clients, such as clients 108–112. The processes illustrated may be implemented in a session layer, such as session layer 306 in FIG. 3.

The process begins by receiving a SID (step 700). A determination is made as to whether the SID is present in the cache (step 702). If the SID is present, a determination is made as to whether the SID entry identified using the SID has expired (step 704). If the SID entry is unexpired, a message is sent to the client to resume the session (step 706) with the process terminating thereafter. Additionally, the SID expiration times may be modified even though the SID entry has not expired. Using such a feature has the same effect as updating the time only when expired.

Figure 8:
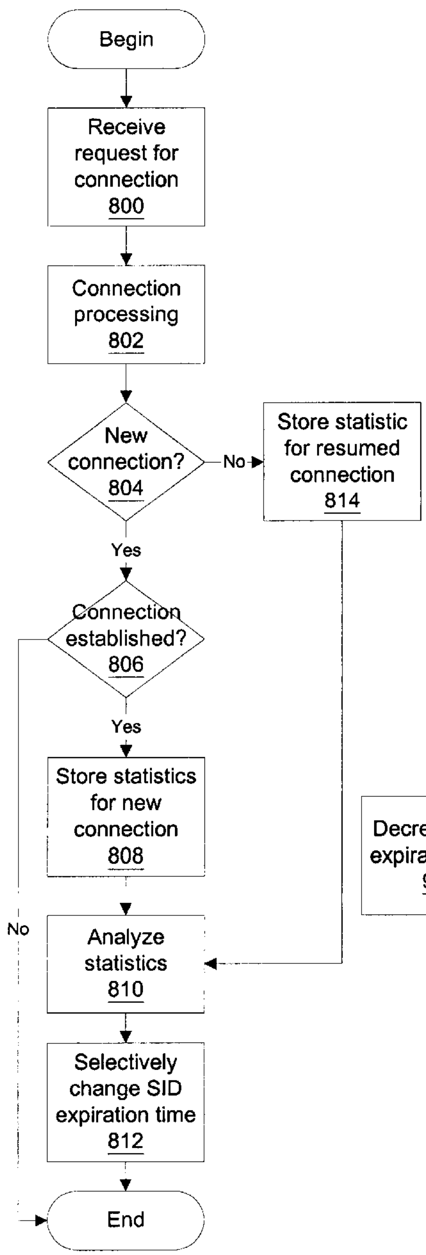
FIG. 8 depicts a flowchart of a process for adjusting SID expiration times in accordance with a preferred embodiment of the present invention.
Figure 9:
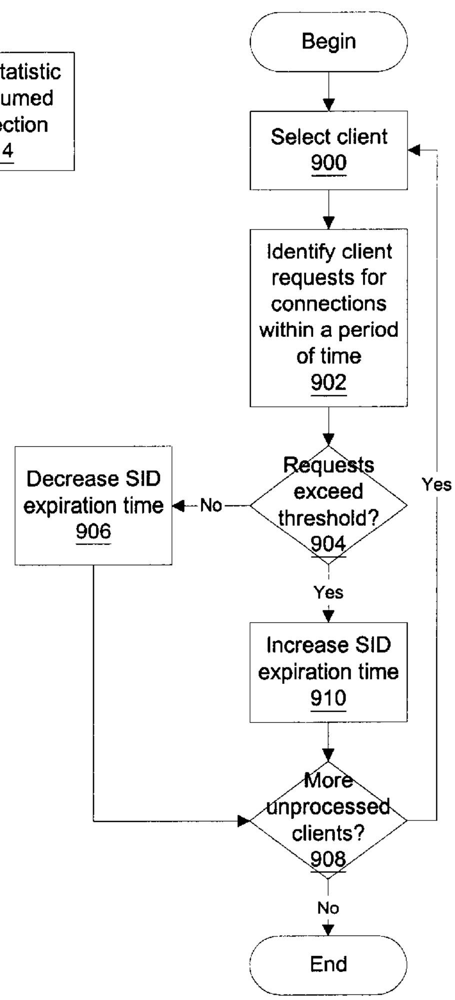
FIG. 9 depicts a flowchart of a process for adjusting SID expiration times based on client usage in accordance with a preferred embodiment of the present invention.
Figure 10:
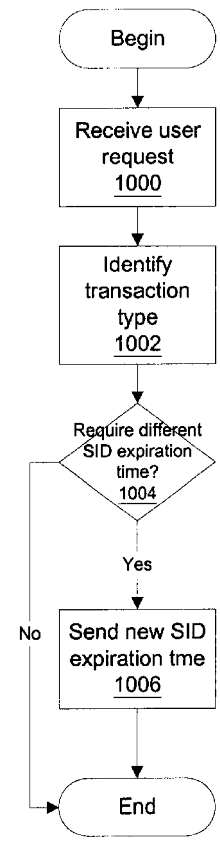
FIG. 10 depicts a flowchart of a process for adjusting SID expiration times using input from an application in accordance with a preferred embodiment of the present invention.

With reference again to step 704, if the SID entry has expired, a determination is made as to whether the SID expiration time should be modified (step 708). SID expiration time refers to the time after which the SID will be considered expired. Whether the expiration time should be modified may be determined using a number of different factors. FIGS. 8–10 below provide examples of processes that may be used to determine when to modify SID expiration time and provide timeout values when SID expiration times are to be modified.

If the SID expiration time is to be modified, a supplied timeout value is used (step 710). A new SID is added to the cache containing the timeout value (step 712). The new SID is sent to the client in a server message, such as a server hello (step 714) with the process terminating thereafter.

With reference again to step 708, if the SID expiration time is not to be modified, then a timeout value is used for the SID (step. 716) with the process then proceeding to step 712 as described above. Referring back to step 702, if a SID is absent from the cache, the process also proceeds to step 708. Additionally, the SID expiration for an existing connection with an unexpired SID may be modified to change the SID expiration.

Turning next to FIG. 8, a flowchart of a process for adjusting SID expiration times is depicted in accordance with a preferred embodiment of the present invention. The process illustrated in FIG. 8 may be implemented in a session layer within a server in these examples.

The process begins by receiving a request for a connection (step 800). Then, connection processing occurs (step 802). This connection processing includes data flow such as those illustrated back in FIG. 4 or FIG. 5 depending on whether the connection is a new connection or a resumed connection. A determination is made as to whether the request is for a new connection (step 804). Whether the connection is a new connection may be determined by whether a SID is received in the request and if a SID is received, if the SID is present and unexpired in the cache.

If it is a new connection, a determination is made as to whether a connection is established (step 806). In some cases, errors may occur in establishing a connection or the client may be unauthorized for the request. If a connection is not established, the process terminates. Otherwise, statistics for the new connection are stored (step 808). For example, in step 808, storing statistics for the new connection may involve updating data tracking the new connections versus resumed connections.

Next, statistics are analyzed (step 810). In this example, the analysis may involve balancing the timeout value versus the search time spent in the cache for requests recently or just made for information in the cache. This balancing may involve comparing the search time to one or more thresholds. The SID expiration time is then selectively changed (step 812). The selective change may involve no change in the SID expiration time, an increase in the SID expiration time, or a decrease in the SID expiration time with the process terminating thereafter. Whether the SID expiration time changes depends on the analysis performed in step 810. The analysis performed and the statistics stored depend on the particular implementation. For example, if one time requests are commonly received from clients that do not return, caching may not occur or a small cache may be maintained. If higher return connections occur based on the analysis, a larger cache may be maintained. The statistics stored may reveal that during a first period of time in a day, clients return often, while during a second period of time during the day, clients seldom return. If the analysis identified such a case, the use of large cache during the first period of time is offset by the use of resumed SSL sessions. During the second period of time, the cache is reduced or eliminated to avoid unproductive overhead.

With reference again to step 804, if the connection is not a new connection, statistics for the resumed connections are stored (step 814) with the process then proceeding to step 810 as described above. The statistics stored for resumed connections may include, for example, the search time required to retrieve information for the resumed connection from the cache.

With reference now to FIG. 9, a flowchart of a process for adjusting SID expiration times based on client usage is depicted in accordance with a preferred embodiment of the present invention. The processes illustrated in FIG. 9 also may be implemented in a session layer within a server. This process may be performed on a data structure or database containing information about clients requesting connections to the server. This information may be gathered as a client requests connections to the server.

The process begins by selecting a client for processing (step 900). Client requests for connections within a period of time are identified (step 902). In these examples, the period of time is used in identifying frequency of client requests. The period of time selected depends on the particular implementation. A determination is made as to whether the number of requests exceed a threshold value (step 904). The threshold value is selected as one that indicates that a client is more likely to request additional connections. This threshold is based on an assumption that if some number of requests are made in a period of time, additional requests are likely to be made. If the requests do not exceed the threshold, an assumption is made that the client is unlikely to return. In such a case, the SID expiration time is decreased (step 906).

A determination is made as to whether more unprocessed clients are present (step 908). If additional unprocessed clients are absent, the process terminates. Otherwise, the process returns to step 900 to select an unprocessed client for processing.

Referring back to step 904, if the number of requests by the client exceed the threshold value, then the SID expiration time is increased (step 910) with the process then proceeding to step 908 as described above.

In this example, a single threshold is used to increase and decrease SID expiration times. Alternatively, more than one threshold may be used to adjust SID expiration times. For example, a first threshold may be used to increase the SID expiration time if the number of connections exceed this threshold. A second threshold lower than the first threshold may be used to lower SID expiration times if the number of connections fall below this threshold. If the number of client requests for connections fall between the thresholds, the SID expiration time may remain unchanged. With reference now to FIG. 10, a flowchart of a process for adjusting SID expiration times using input from an application is depicted in accordance with a preferred embodiment of the present invention. The process illustrated in FIG. 10 may be implemented in an application layer in a server in these examples. Based on user inputs, an application may send adjustments to SID expiration times to allow the right amount of time for particular actions.

The process begins by receiving a user request (step 1000). The transaction type for the request is identified (step 1002). These transactions may vary from ones requiring very little time to ones that require large amounts of time. For example, receipt of a user request for information may require only a few seconds while receipt of a request to place an order for an item may take a number of minutes.

A determination is then made as to whether a different SID expiration time is needed (step 1004). The amount of time predicted for a particular request or activity is compared to the default or standard SID expiration time. If a different amount of time is needed, then the new SID expiration time is sent (step 1006) with the process terminating thereafter. The SID expiration time may be sent to the processes in the session layer through a number of different mechanisms, such as an API. Referring back to step 1004, if a different expiration time is not required, then the process terminates.

Figure 11:
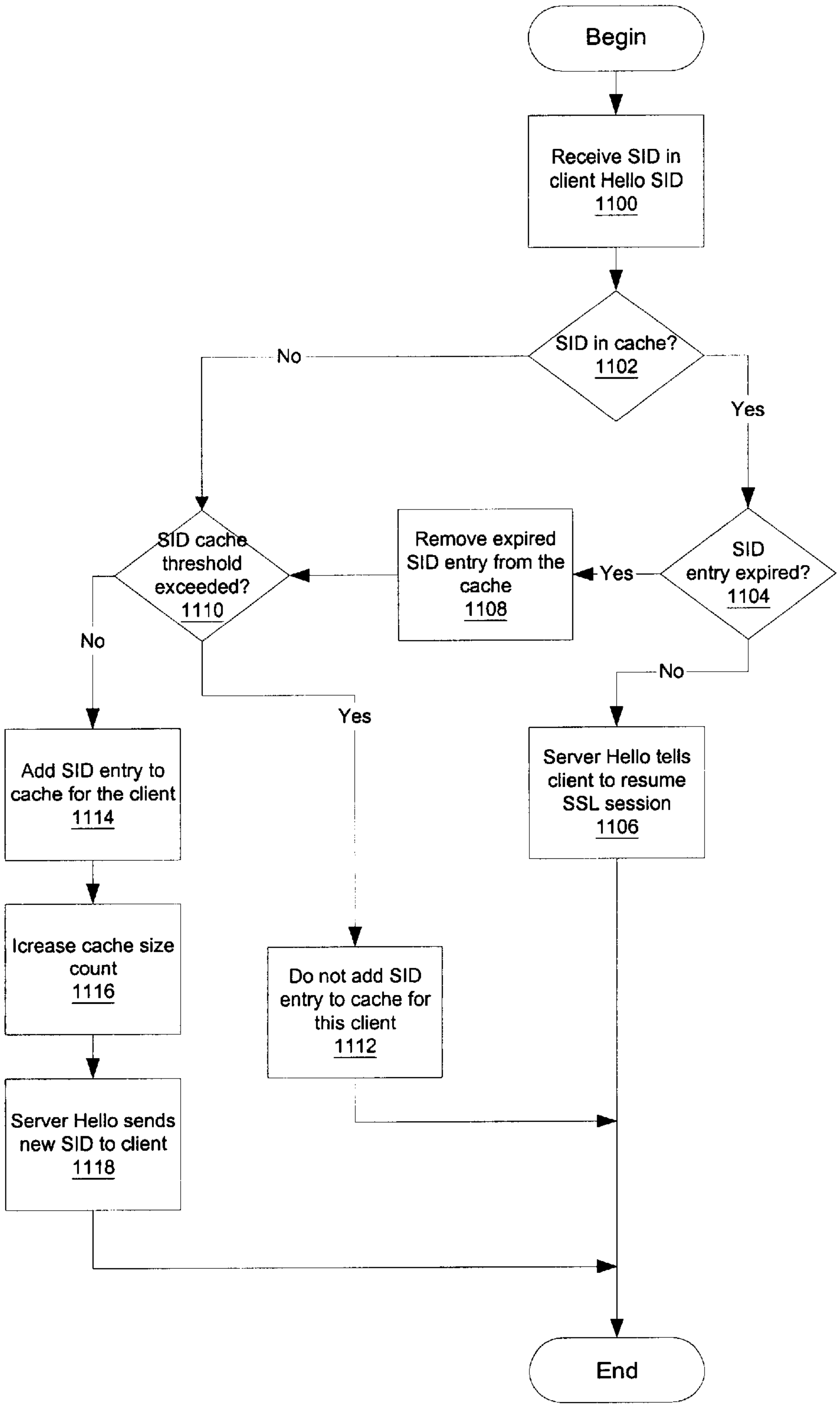
FIG. 11 is a flowchart of a process for processing SID entries based on cache size in accordance with a preferred embodiment of the present invention.

Turning now to FIG. 11, a flowchart of a process for processing SID entries based on cache size is depicted in accordance with a preferred embodiment of the present invention. The process begins by receiving a SID in a client hello message (step 1100). A determination is made as to whether the SID is present in the cache (step 1102). If the SID is present in the cache, a determination is made as to whether the SID entry has expired (step 1104). If the SID entry has not expired, a server hello message is sent to the client to resume the SSL session (step 1106) with the process terminating thereafter.

With reference again to step 1104, if the SID entry has expired, the expired SID entry is removed from the cache (step 1108). Then, a determination is made as to whether the SID cache threshold has been exceeded (step 1110). One possible threshold criteria is the number of cache entries in which the amount of time needed to search the cache exceeds the amount of time spent by the server to complete a full handshake with the client. If the threshold has been exceeded, a SID entry is not added to the cache for this client (step 1112) with the process terminating thereafter.

On the other hand, if the SID cache threshold is not exceeded, then a SID entry is added to the cache for the client (step 1114). The cache size count is then incremented (step 1116), and a server hello message is sent to the client containing the new SID (step 1118) with the process terminating thereafter.

With reference back to step 1102, if the SID received from the client is not in the cache, the process proceeds to step 1110 as described above.

Figure 12:
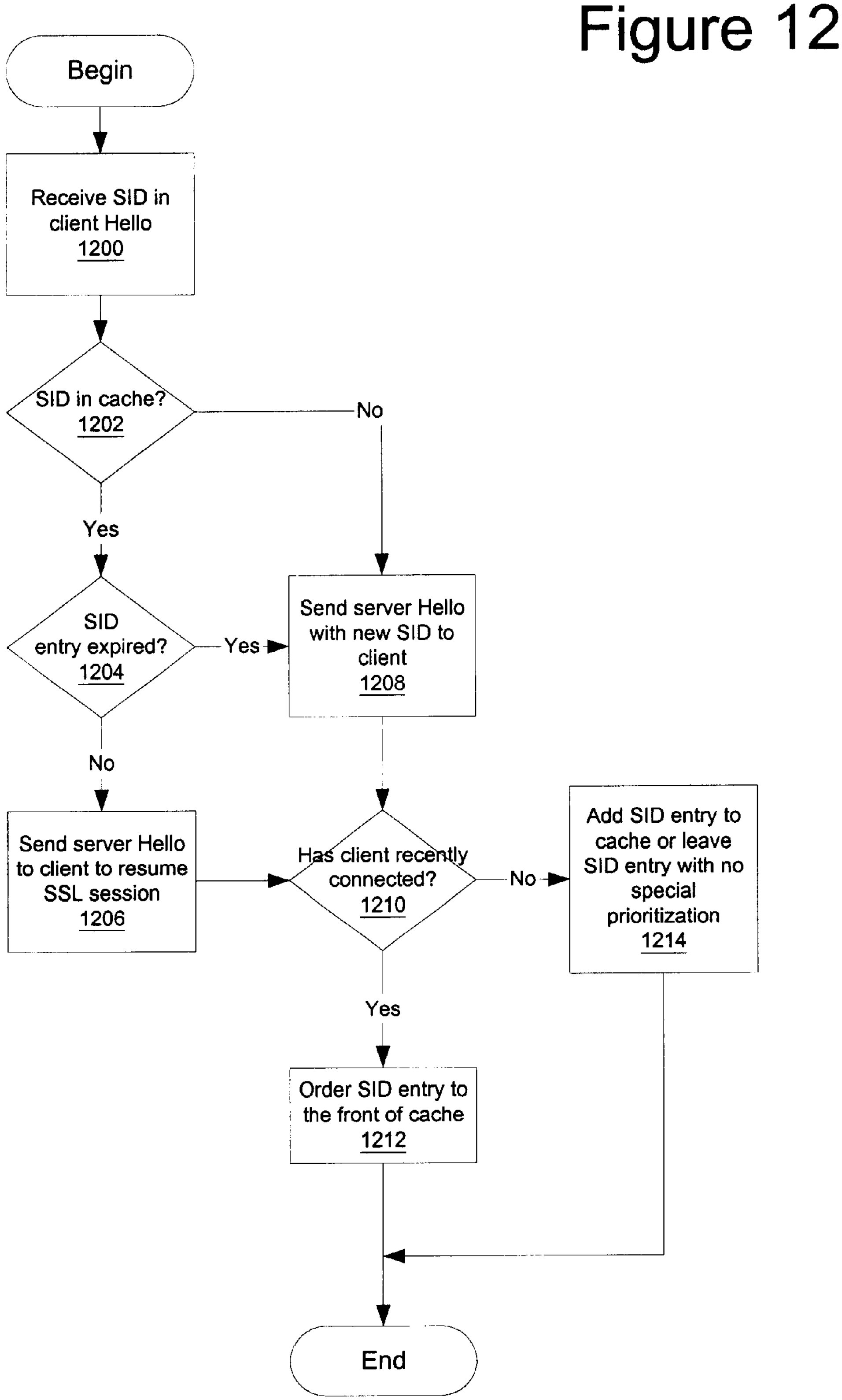
FIG. 12 is a flowchart of a process for reducing search time in a cache based on frequency of use in accordance with a preferred embodiment of the present invention.

Turning next to FIG. 12, a flowchart of a process for reducing search time in a cache based on frequency of use is depicted in accordance with a preferred embodiment of the present invention. The process begins by receiving a SID in a client hello message (step 1200). A determination is made as to whether the SID is located in the cache (step 1202). If the SID is found in the cache, a determination is made as to whether the SID entry for this SID has expired (step 1204). If the SID entry has not expired, a server hello message is sent to the client to resume the SSL session (step 1206). On the other hand, if the SID entry has expired, a server hello message with a new SID is sent to the client (step 1208). In either case, a determination is then made as to whether the client has recently connected (step 1210).

If the client has recently connected to the server, the SID entry for this client is ordered or moved to the front of the cache search order in anticipation that the client will soon return (step 1212) with the process terminating thereafter. On the other hand, if the client has not recently connected to the server, the SID entry is left in its current position or added with no special prioritization (step 1214) with the process terminating thereafter.

With reference again to step 1202, if the SID is not found in the cache, the process proceeds to step 1208 as described above.

Thus, the present invention provides an improved method, apparatus, and computer implemented instructions for use in handling connections to a computer. The advantage provided by the mechanism of the present invention includes dynamically adjusting the time during which information used for connections between a client and a server will be valid or present. The adjustments are made to optimize the performance of the server. The adjustments are made to avoid performance hits occurring when a cache becomes too large and the time taken to obtain information from the cache becomes greater than the time needed to recreate the information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the processes of the present invention are illustrated in the context of secured transactions using SSL, the processes of the present invention may be applied to security protocols, such as, for example, transport level security (TLS). Further, the processes also may be applied to handling information used to transfer data in unsecured connections. Additionally, the examples of cache management presented are for illustrative purposes and are not intended to limit the types of cache management mechanisms that may be used to optimize performance of the server in handling sessions with clients. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing sessions for a secure access to the data processing system, the method comprising:

receiving a request for a secure connection;

establishing the secure connection, wherein information used to facilitate the secure connection is generated; and storing the information for a selected period of time to form stored information, wherein the selected period of time is dynamically adjusted to optimize server resources for use in subsequent secure connections, wherein the storing step comprises:

storing the information in a cache, wherein the cache stores information used to facilitate secure connections handled by the data processing system;

identifying a number of new secure connections and a number of resume secure connections; and setting the selected period of time based on a cache usage.

2. The method of claim 1, wherein the setting step is performed dynamically for all information in the cache.

3. The method of claim 1, wherein the setting step is performed only at a time when the information is stored in the cache.

4. A method in a data processing system for managing sessions for a secure access to the data processing system, the method comprising:

receiving a request for a secure connection;

establishing the secure connection, wherein information used to facilitate the secure connections is generated;

storing the information for a selected period of time to form stored information, wherein the selected period of time is dynamically adjusted to optimize server resources for use in subsequent secure connections; and setting the selected period of time for the information based on search time required to find entries in the cache.

5. The method of claim 4, wherein the setting step includes:

reducing the selected period of time if the search time is greater than a threshold.

6. The method of claim 5, wherein the threshold is a first threshold and wherein the setting step includes:

increasing the selected period of time if the search time is less than a second threshold.

7. The method of claim 6, wherein the first threshold and the second threshold are identical.

8. A method in a data processing system for managing sessions for a secure access to the data processing system, the method comprising:

receiving a request for a secure connection;

establishing the secure connection, wherein information used to facilitate the secure connection is generated;

storing the information for a selected period of time to form stored information, wherein the selected period of time is dynamically adjusted to optimize server resources for use in subsequent secure connections; and setting the selected period of time based on a type of request for the secure connection.

9. A method in a data processing system for managing sessions for a secure access to the data processing system, the method comprising:

receiving a request from a client for a secure connection;

establishing the secure connection, wherein information used to facilitate the secure connection is generated;

storing the information for a selected period of time to form stored information, wherein the selected period of time is dynamically adjusted to optimize server resources for use in subsequent secure connections;

determining a likelihood of the client requesting additional secure connections within a time period; and setting the selected period of time based on the likelihood.

10. A data processing system for managing sessions for a secure access, the data processing system comprising:

receiving means for receiving a request for a secure connection;

establishing means for establishing the secure connection, wherein information used to facilitate the secure connection is generated; and storing means for storing the information for a selected period of time to form stored information, wherein the selected period of time is dynamically adjusted to optimize server resources for use in subsequent secure connections, wherein the storing means comprises:

storing means for storing the information in a cache, wherein the cache stores information used to facilitate secure connections handled by the data processing system;

identifying means for identifying a number of new secure connections and a number of resume secure connections; and setting means for setting the selected period of time based on a cache usage.

11. The data processing system of claim 10, wherein the setting means is performed dynamically for all information in the cache.

12. The data processing system of claim 10, wherein the setting means is performed only at a time when the information is stored in the cache.

13. A data processing system for managing sessions for a secure access, the data processing system comprising:

receiving means for receiving a request for a secure connection;

establishing means for establishing the secure connection, wherein information used to facilitate the secure connection is generated; storing means for storing the information for a selected period of time to form stored information, wherein the selected period of time is dynamically adjusted to optimize server resources for use in subsequent secure connection; and setting means for setting the selected period of time for the information based on search time required to find entries in the cache.

14. The data processing system of claim 13, wherein the setting means includes:

reducing means for reducing the selected period of time if the search time is greater than a threshold.

15. The data processing system of claim 14, wherein the threshold is a first threshold and wherein the setting means includes:

increasing means for increasing the selected period of time if the search time is less than a second threshold.

16. The data processing system of claim 15, wherein the first threshold and the second threshold are identical.

17. A data processing system for managing sessions for a secure access, the data processing system comprising:

receiving means for receiving a request for a secure connection;

establishing means for establishing the secure connection, wherein information used to facilitate the secure connection is generated; storing means for storing the information for a selected period of time to form stored information, wherein the selected period of time is dynamically adjusted to optimize server resources for use in subsequent secure connections; and setting means for setting the selected period of time based on a type of request for the secure connection.

18. A data processing system for managing sessions for a secure access, the data processing system comprising:

receiving means for receiving a request from a client for a secure connection;

establishing means for establishing the secure connection, wherein information used to facilitate the secure connection is generated;

storing means for storing the information for a selected period of time to form stored information, wherein the selected period of time is dynamically adjusted to optimize server resources for use in subsequent secure connections;

determining means for determining a likelihood of the client requesting additional secure connections within a time period; and setting means for setting the selected period of time based on the likelihood.

* * * * *